US006477862B1

United States Patent
Wacke

(10) Patent No.: US 6,477,862 B1
(45) Date of Patent: Nov. 12, 2002

(54) MONITORING GOB DIAMETER IN A GLASSWARE FORMING SYSTEM

(75) Inventor: Robert S. Wacke, Toledo, OH (US)

(73) Assignee: Owens-Brockway Glass Container Inc., Toledo, OH (US)

( * ) Notice: Subject to any disclaimer, the term of this patent is extended or adjusted under 35 U.S.C. 154(b) by 253 days.

(21) Appl. No.: 09/643,817

(22) Filed: Aug. 22, 2000

(51) Int. Cl.$^7$ ................................................. C03B 5/24
(52) U.S. Cl. .................... 65/29.14; 65/29.18; 65/29.19; 65/29.21; 65/158; 65/159; 65/162; 65/164
(58) Field of Search ...................... 73/204.21; 65/29.11, 65/29.14, 29.18, 29.19, 29.21, 158, 159, 162, 164

(56) References Cited

U.S. PATENT DOCUMENTS

| | | | | |
|---|---|---|---|---|
| 1,898,705 A | * | 2/1933 | Wood et al. ................ 250/215 |
| 1,941,552 A | * | 1/1934 | Henry et al. .................. 177/60 |
| 2,010,777 A | * | 8/1935 | Grotta .......................... 65/164 |
| 2,262,070 A | | 11/1941 | Turk |
| 2,974,359 A | | 3/1961 | VanDer Hoven |
| 3,002,226 A | | 10/1961 | Warthen |
| 3,223,502 A | | 12/1965 | Ward et al. |
| 3,236,099 A | | 2/1966 | Warthen |
| 3,324,721 A | | 6/1967 | Warthen |
| 3,326,655 A | * | 6/1967 | Penberthy ..................... 373/35 |
| 3,741,742 A | | 6/1973 | Jennings |
| 3,846,107 A | * | 11/1974 | Foster et al. ................... 65/164 |
| 3,860,407 A | * | 1/1975 | Fertik ............................ 65/161 |
| 3,874,864 A | | 4/1975 | Peters et al. |
| 3,983,751 A | | 10/1976 | Cipriano |
| 3,988,139 A | * | 10/1976 | Goodwin ....................... 65/128 |
| 4,011,070 A | * | 3/1977 | Hynd .......................... 65/135.1 |
| 4,090,241 A | | 5/1978 | Houston |
| 4,165,975 A | | 8/1979 | Kwiatkowski et al. |
| 4,205,973 A | | 6/1980 | Ryan |
| 4,312,658 A | | 1/1982 | Mayer |
| 4,362,544 A | | 12/1982 | Mallory |
| 4,654,066 A | * | 3/1987 | Garcia et al. .................. 65/162 |
| 4,708,729 A | * | 11/1987 | Cardenas-Franco et al. .. 65/162 |
| 4,812,151 A | | 3/1989 | Sheinkop et al. |
| 5,139,559 A | * | 8/1992 | Kozora ......................... 65/158 |
| 5,266,093 A | * | 11/1993 | Konishi et al. ................ 65/158 |
| 5,417,797 A | | 5/1995 | Tooker |
| 5,917,106 A | | 6/1999 | Cirincione et al. |
| 5,925,159 A | | 7/1999 | Geisel |

\* cited by examiner

Primary Examiner—Sean Vincent

(57) ABSTRACT

A glassware manufacturing system includes at least one blank mold and a loading funnel for feeding molten glass gobs in sequence into the blank mold. A temperature sensor is operatively coupled to the external surface of the funnel for providing an electrical signal indicative of temperature at the funnel due to heat imparted thereto by the molten glass gobs falling through the funnel. Electronics are responsive to the sensor signal for indicating an increase in gob diameter as a function of an increase in temperature at the funnel external surface.

10 Claims, 1 Drawing Sheet

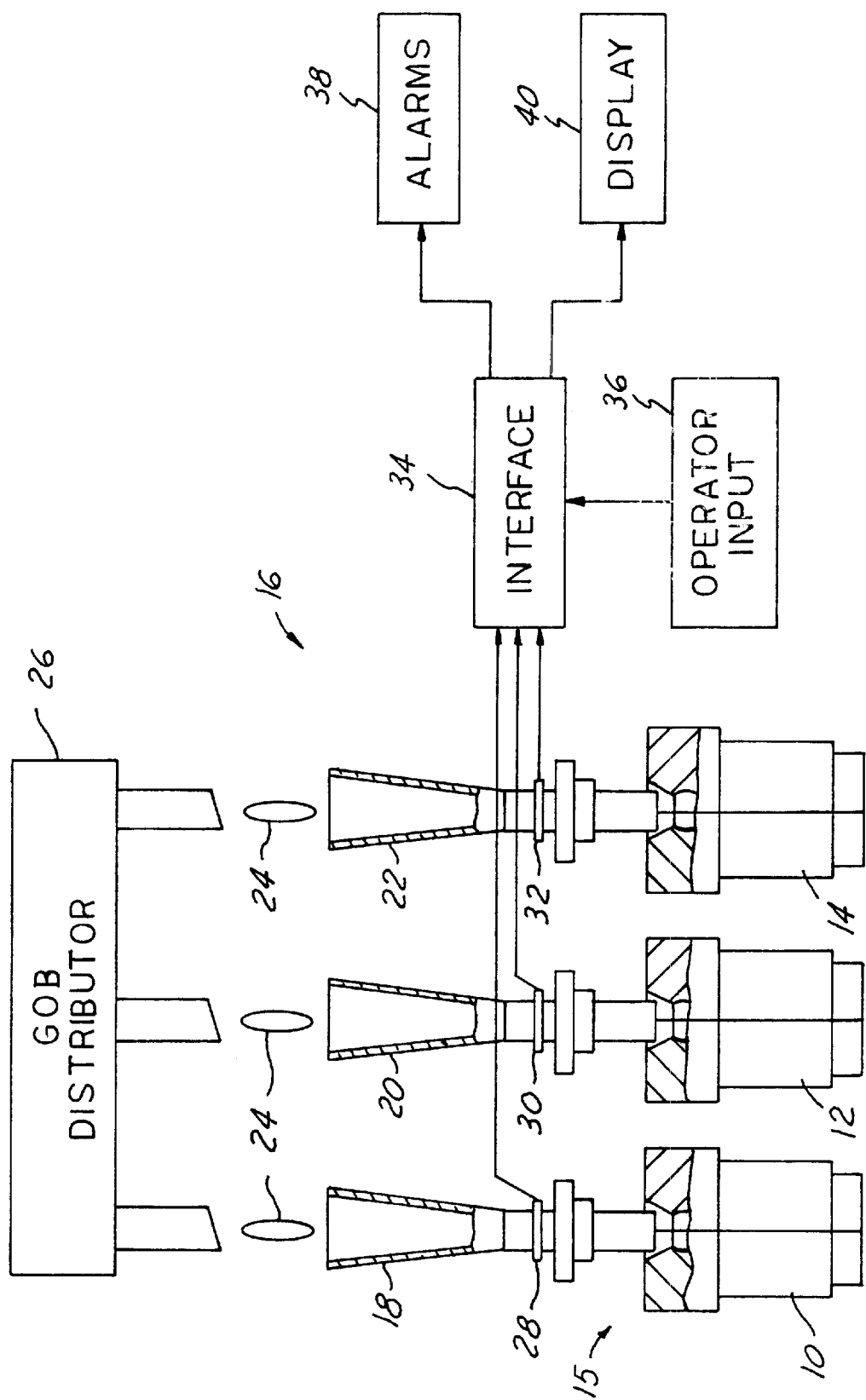

MONITORING GOB DIAMETER IN A GLASSWARE FORMING SYSTEM

The present invention is directed to glassware forming systems that form articles of glassware from individual molten glass gobs, and more particularly to a method and apparatus for monitoring diameter of the molten glass gobs as they are fed to the forming system.

BACKGROUND AND SUMMARY OF THE INVENTION

The art of manufacturing articles of glassware, such as glass containers, is currently served by the so-called individual section machine. Such a machine includes a plurality of separate or individual manufacturing sections, each of which has a multiplicity of operating mechanisms for converting one or more charges or gobs of molten glass into articles of glassware such as hollow glass containers, and for transferring the containers through successive stages of the machine section. In general, an individual section glassware forming machine system includes a glass source with a needle mechanism for controlling a stream of molten glass, a shear mechanism for cutting the molten glass into individual gobs, and a gob distributor for distributing the individual gobs among the individual machine sections. Each machine section includes one or more blank molds to which the molten glass gobs are fed through a loading funnel as illustrated in U.S. Pat. No. 5,917,106, and in which each glass gob is initially formed in a blowing or pressing operation. One or more invert arms transfer the blanks to blow molds in which the articles are blown to final form, tongs remove the formed articles onto a deadplate, and a sweepout mechanism transfers molded glass articles from the deadplate onto a machine conveyor. The conveyor receives containers from all sections of the individual section machine, and conveys the containers to a loader for transfer to an annealing lehr. Operating mechanisms in each section also provide for closure of mold halves, movement of baffles and blow nozzles, control of cooling wind, etc. U.S. Pat. No. 4,362,544 includes a background discussion of the art of both "blow and blow" and "press and blow" glassware forming processes, and also discusses an electropneumatic individual section machine adapted for use in either process.

During operation of an individual section machine glassware forming system of this type, such factors as wear and erosion of the glass feed orifice at the molten glass source, or increase in glass forehearth temperature, can cause an increase in diameter of the molten glass gobs being fed to the blank molds of the individual machine sections. An increase in gob diameter can cause plugging or blocking of one or more blank loading funnels, necessitating shut-down and repair of at least one section of the glassware forming machine. It is an object of the present invention to provide a method and apparatus for monitoring the diameter of the molten glass gobs, and specifically for indicating an increase in molten glass gob diameter to a point at which there is a risk of blockage of the blank mold loading funnels.

A glassware manufacturing system in accordance with a presently preferred embodiment of the invention includes at least one blank mold, means such as a funnel for feeding gobs of molten glass in sequence to the blank mold, and means for monitoring diameter of the molten glass gobs. A temperature sensor is operatively coupled to the feeding means for providing an electrical signal indicative of temperature at the feeding means due to heat imparted thereto by the molten glass gobs, and means are responsive to the electrical signal for determining diameter of the molten glass gobs traveling through the feeding means. In the preferred apparatus of the invention, in which the feeding means includes a loading funnel for feeding molten glass gobs into each blank mold, the temperature sensor is operatively coupled to the funnel, and specifically to the outside surface of the funnel, for providing a measure of temperature at the outside funnel surface due to heat transfer through the funnel from molten glass gobs falling through the inside of the funnel. A change in the sensor signal, particularly an increase in the sensor signal, is interpreted as indicating an increase in gob diameter and potential blockage of the funnel.

In an individual section glassware forming machine in accordance with another aspect of the invention, each machine section has at least one blank mold, a loading funnel for feeding molten glass gobs into the blank mold, and a temperature sensor operatively coupled to an external surface of the funnel for providing an indication of temperature at the external surface by heat transfer through the funnel from molten glass gobs traveling through the funnel. Electronics are responsive to the sensor for indicating an increase in gob diameter as a function of an increase in temperature at the funnel external surface. In the preferred embodiment, the temperature at the sensor is compared with a preset or predetermined threshold, and an excessive gob diameter is indicated when funnel external surface temperature exceeds such threshold.

A method of monitoring diameter of molten glass gobs fed in sequence through a funnel to a blank mold of a glassware forming machine in accordance with a third aspect of the invention includes the steps of monitoring heat transfer from the molten glass gobs to the loading funnel and indicating an increase in gob diameter as a function of an increase in temperature at the funnel. Heat transfer to the funnel is monitored by operatively coupling a temperature sensor to the external surface of the funnel for monitoring heat transfer through the funnel from the glass gobs. An increase in gob diameter is indicated by comparing temperature of the funnel external surface to a predetermined threshold.

BRIEF DESCRIPTION OF THE DRAWING

The invention, together with additional objects, features and advantages thereof, will be best understood from the following description, the appended claims and the accompanying drawing, which is a functional block diagram of an individual section glassware forming system in accordance with a presently preferred embodiment of the invention.

DETAILED DESCRIPTION OF PREFERRED EMBODIMENTS

The disclosure of above-noted U.S. Pat. Nos. 4,362,544 and 5,917,106 are incorporated herein by reference for purposes of background.

The drawing is a functional block diagram that illustrates implementation of a presently preferred embodiment of the invention in conjunction with the blank molds 10, 12, 14 of one section 15 of an individual section machine glassware forming system 16. The machine is thus a so-called triple-gob machine, in which each machine section 15 includes three blank molds 12–14, three blow molds, etc. Each blank mold 10, 12, 14 has an associated loading funnel 18, 20, 22 for receiving molten glass gobs 24 from a gob distributor 26 and associated chutes, etc. In general, molten glass gobs 24 fall through funnels 18, 20, 22 into blank molds 10–14, in which the gobs are pressed or blown to form a molten blank or parison. The parisons are then transferred to the blow molds for final blowing into articles of glassware, moved onto the deadplates and transferred to the machine conveyor as described above. As disclosed in above-referenced U.S. Pat. No. 5,917,106, each loading funnel 18, 20, 22 has sufficient axial dimension, preferably at least as long as gobs 24, to align the longitudinal axes of the gobs with the central axes of the blank molds. The cross sections of the funnels may also be contoured for shaping and sizing the gobs. The loading funnels may be moveable for placement of settle blow baffles over the blank molds, or baffle mechanisms may be built into the funnels.

In accordance with the present invention, a temperature sensor 28, 30, 32 is operatively coupled to the external surface of a respective associated funnel 18, 20, 22, specifically at the narrow neck of each funnel. Temperature sensors 28, 30, 32 sense the outside surface temperatures at the necks of funnels 18, 20, 22 due to heat transferred through the wall of each funnel from the molten glass gobs falling through the funnel. Temperature sensors 28, 30, 32 may comprise thermocouples clamped to the outside surfaces of the funnels, or infrared sensors for non-contact monitoring of external funnel surface temperatures. Sensors 28, 30, 32 are connected to an electronic interface 34, which also receives an operator input 36 for setting temperature comparison thresholds and other variables. Interface 34 provides output signals to alarms 38 for indicating an increase in gob diameter to a point at which there is a potential for funnel blockage, and to a display 40 for indicating funnel temperature and other desired variables. There may be a separate alarm for each funnel 18, 20, 22.

Funnels 18, 20, 22 are of heat conductive metal construction such as stainless steel, for example, having an exemplary wall thickness of 0.125 inches. Thus, the outside surface temperature of the funnels closely tracks the inside surface temperature, which in turn varies as a function of heat transfer from the molten glass gobs. During normal operation, nominal gob outside diameter may typically be about 2 mm less than the inside diameter of the neck of each funnel. At this nominal gob diameter, the average temperature at the surface of a blank loading funnel neck may be in the range of 320° F. to 400° F. Inasmuch as the thermal conductivity of the funnel wall is quite high, the outside surface temperature, sampled and averaged at interface 34 over a few seconds, provides an indication of the inside surface temperature. Inside surface temperature will vary as a function, among other variables, of spacing between gob outside diameter and funnel inside diameter, and thus as a function of gob diameter inasmuch as funnel inside diameter remains fixed. A change in outside funnel surface temperature thus may be interpreted as being caused by a change of gob diameter, with all other variables such as molten glass temperature remaining constant. Operator input 36 maybe employed to set a high-temperature alarm threshold at interface 34. For example, interface 34 may be programmed by input 36 to provide an alarm 38 in the event that an external funnel surface temperature reaches a level of 380° F., which may indicate an increase in gob diameter to a point at which funnel blockage may occur. Steps may then be taken to correct gob diameter. Alternatively, a first alarm threshold of 380° F. may be input, for example, to provide an alarm warning indication, and a second alarm threshold may be input, such as 400° F. for example, to terminate section or machine operation. Interface 34 and display 40 may be programmed to provide an apparent measurement of (average) gob diameter (under the assumption that other factors, such as molten glass temperature, remain constant).

There has thus been disclosed an apparatus and method for monitoring molten glass gob diameter in a glassware forming machine system that fully satisfy all of the objects and aims previously set forth. A number of modifications and variations have been disclosed. Other modifications and variations will readily suggest themselves to persons of ordinary skill in the art. The invention is intended to embrace all such modifications and variations as fall within the spirit and broad scope of the appended claims.

What is claimed is:

1. A glassware manufacturing system that includes at least one blank mold, means for feeding gobs of molten glass in sequence to said at least one blank mold, and means for monitoring diameter of the molten glass gobs comprising:

at least one temperature sensor operatively coupled to said feeding means for providing an electrical signal indicative of temperature at said feeding means due to heat imparted thereto by said molten glass gobs, and means responsive to said electrical signal for determining diameter of the molten glass gobs traveling through said feeding means.

2. The system set forth in claim 1 wherein said feeding means comprises a funnel for feeding molten glass gobs into said blank mold, and wherein said temperature sensor is coupled to said funnel for providing said electrical signal as a function of temperature at said funnel.

3. The system set forth in claim 2 wherein said temperature sensor is operatively coupled to an outside surface of said funnel and is responsive to temperature of said outside surface due to heat transfer through said funnel from molten glass gobs falling through said funnel.

4. The system set forth in claim 2 wherein said signal-responsive means is responsive to a change in said signal for inferring a change in gob diameter.

5. The system set forth in claim 4 wherein said signal-responsive means is responsive to an increase in temperature at said sensor for indicating potential blockage of said funnel by a molten glass gob.

6. An individual section glassware forming machine that includes a plurality of machine sections, each having at least one blank mold and a funnel for feeding molten glass gobs into said at least one blank mold, and means for monitoring diameter of the molten glass gobs traveling through said funnel to said at least one blank mold, comprising:

a temperature sensor operatively coupled to an external surface of said funnel for providing an indication of temperature at said external surface by heat transfer through said funnel from molten glass gobs traveling through said funnel, and means responsive to said sensor for indicating changes in gob diameter as a function of changes in temperature at said funnel external surface.

7. The machine set forth in claim 6 wherein said sensor-responsive means comprises means for comparing temperature sensed by said sensor with a predetermined threshold, and means for indicating an excessive gob diameter when said temperature exceeds said threshold.

8. A method of monitoring diameter of molten glass gobs in which the gobs are fed in sequence through a funnel to a blank mold of a glassware forming machine, comprising the steps of:

(a) monitoring heat transfer from the molten glass gobs to the funnel, and (b) indicating changes in gob diameter as a function of changes in temperature at the funnel.

9. The machine set forth in claim 8 wherein said step (a) comprises the step of monitoring external surface temperature of said funnel by operatively coupling a temperature sensor to said external surface.

10. The machine set forth in claim 9 wherein said step (b) comprises the step of comparing temperature of said external surface to a predetermined threshold.

* * * * *